Patented Aug. 14, 1945

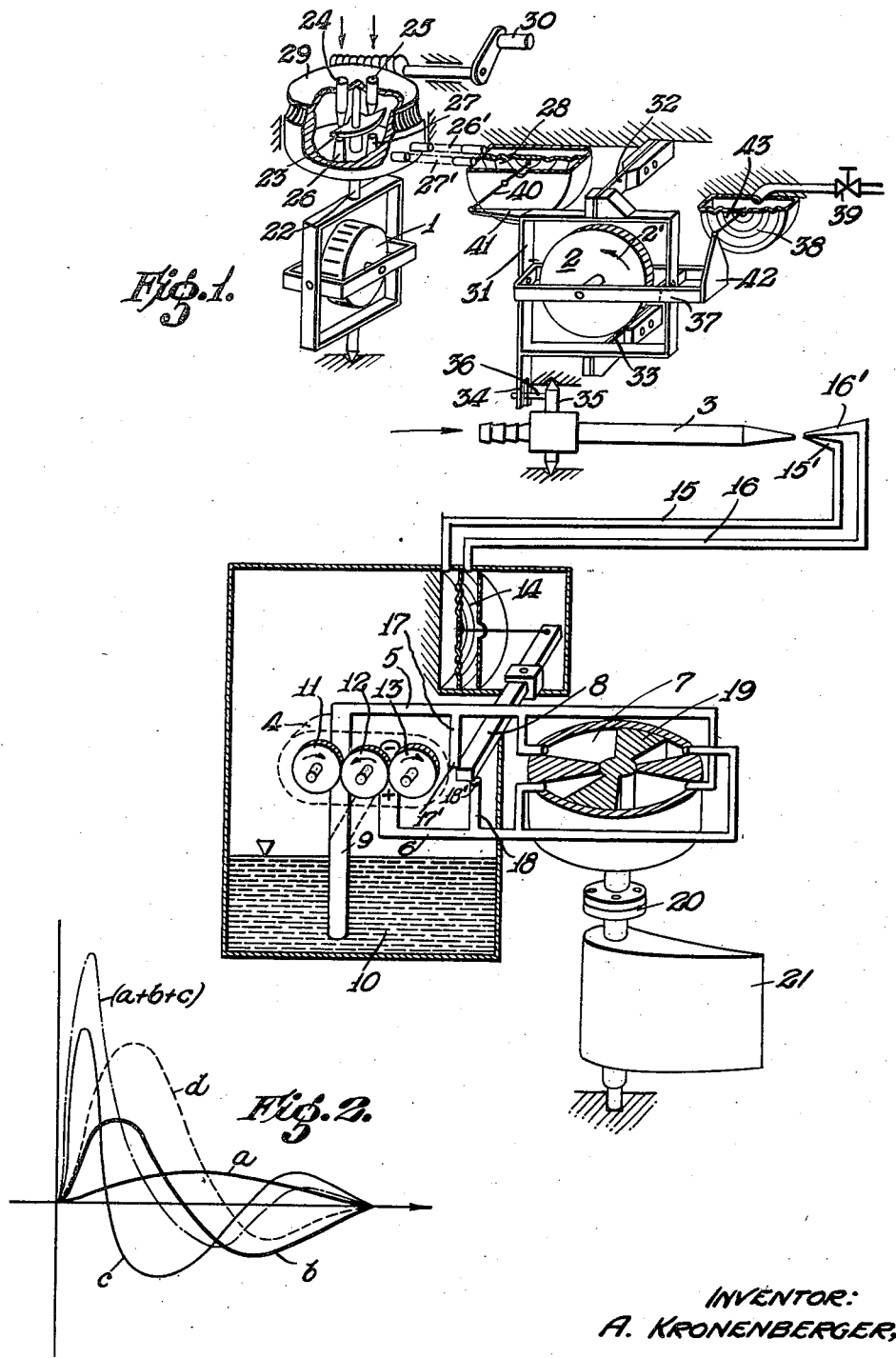

2,382,727

UNITED STATES PATENT OFFICE 2,382,727

AUTOMATIC STEERING DEVICE FOR AIRCRAFT

Adam Kronenberger, Berlin, Germany; vested in the Alien Property Custodian

Application January 6, 1940, Serial No. 312,691
In Germany December 23, 1937

2 Claims. (Cl. 244—79)

With the greater aerodynamic improvement of airplanes, even greater demands are made on automatic steering devices for aircraft because the damping of the airplane itself is naturally reduced more and more. Furthermore, the increased speed of flight requires a better threshold sensitivity of the automatic steering device in order to obtain the same accuracy of steering as before.

With the types of aircraft generally in use until recently, having a high fuselage resistance, it was sufficient for the correction of the flying attitude to obtain a steering impulse depending upon said attitude in connection with a repeat-back device. This steering impulse in future will be referred to as "an attitude value." By means of the repeat-back the rudder angle is made proportional to the amplitude of deviation from the normal flying attitude.

The use of a repeat-back device has the disadvantage that with a given deviation, the same rudder angle is always produced regardless of speed, while with high flying speeds small rudder angles would be desirable, and with low flying speeds larger rudder angles, in order to bring the airplane back into its normal position.

This particular fact becomes more and more important because of the much higher speed range of modern airplanes. While until recently the range between landing speed and cruising speed was about 100 to 200 km. per hour, corresponding to a dynamic pressure range of 1:4, the present range is 100 to 500 km. per hour and more, corresponding to a dynamic pressure range of 1:25.

The repeat-back also has the further disadvantage that the steering impulses caused by disturbing the flying attitude are weakened by same, so that the steering effect is not sufficient in case of disturbances caused by bumpy weather, while otherwise the steering impulses cannot be made too large in order to prevent hunting of the steering apparatus during straight flight.

In order to satisfy the increased demands caused by modern airplanes with respect to the damping of disturbances, the automatic steering device has to be so designed that it can deliver an additional amount of damping of sufficient magnitude. In order to quickly correct disturbances without hunting, it is necessary to counteract the rudder motion at the correct time, and it is well known, according to physical laws, that the damping momentum caused by counteraction of the rudder must be proportional generally to the speed or rate of change of amplitude of the disturbance. This means that the counteracting rudder motion produced by the instrument must be produced with sufficient lead as to time. For instance, if the airplane is thrown off its course by means of a gust of wind, the rudder should have its largest angle at the same time at which the angular velocity of the airplane due to the turbance reaches its maximum value. In order to fulfill these demands, the power control switch of the steering device has received, in addition to the attitude value, impulses produced by a gyro responsive to the angular velocity of the airplane. In connection with a repeat-back, as it was used with previous installations for the limitation of the angular motion of the rudder, it is retarded in its angular velocity and the magnitude of its motion.

The magnitude of the steering impulses is limited by the capacity of the steering device. If this is surpassed, which means that the sensitivity is made too high so that maximum speed of the rudder motor is obtained even with comparatively small disturbances, then with greater disturbances the automatic steering device functions as a limited steering device, which means that in overcoming a disturbance which is only a small percentage of the total disturbance, the rudder already moves with maximum speed so that higher values cannot be obtained.

In order to obtain an automatic steering device which will cover the whole range of disturbances, it is therefore necessary that there be approximate proportionality between the value of the disturbance and the capacity of the rudder motor system. On the other hand, it is necessary to sufficiently strongly hold the airplane to its intended position so that the correction of the flying attitude is obtained with the necessary speed. For instance, in squally weather the airplane should be corrected as much as possible after one gust of wind before the next gust throws it off its course again.

Furthermore, it is necessary in order to obtain correct steering effects, that the several rudders be made to respond with as small a time lag as possible and that rudder amplitudes obtained not only disappear as the airplane returns to its intended position, but that in addition thereto an opposite rudder motion be produced proportional to the angular velocity of the airplane in order to prevent overshooting.

According to the present invention, the above conditions will be correctly handled by the combination of a steering relay independent from the rudder position with a hydraulic device for the control of the steering elements, in such a way that the steering relay is controlled by means of an attitude value impulse generator and by another impulse generator responsive to angular velocities, for instance, a spring controlled gyro which measures angular velocity of the airplane and, if necessary, also angular accelerations, while the hydraulic device is designed so that it can yield to exterior forces and so that its speed generally is proportional to the sum of the steering impulses.

The device of the present invention obtains a steering effect which practically has no time lag and is independent of the speed of the airplane. The rudder is moved back into its original position under the influence of the opposing forces caused by the relative air speed as soon as the steering impulse produced by a disturbance disappears, without the necessity of obtaining a counteracting steering impulse, which normally is necessary with all self-locking steering devices. To this is added an impulse produced by the angular velocity of the airplane which would cause a counteracting rudder angle if the airplane returns to its original position too fast, so that this effect produces sufficient damping. In order to further increase the damping effect of the automatic steering device, the power valve may also be controlled by an impulse proportional to the angular acceleration. This would cause correct steering impulses just as soon as the disturbance starts.

It is very essential for correct functioning of the automatic steering device that friction and back-lash be prevented. In its simplest form this can be done by the use of members which are stiff in the direction of their effect but yielding normal thereto; like, for instance, spring wires or leaf springs, for the mechanical connection of the power valve with the steering impulse generator. The damping of the gyro, which in turn causes damping of the motion of the airplane, can be made free of friction by using as a damping device for the precession of the gyro spring bellows from which pressure fluid escapes through a small hole. As the precession angles of the gyro are small, the gyro frame is preferably carried by leaf springs instead of the usual ball bearings in order to further reduce friction.

The above described improvements permit obtaining a minimum of friction, thereby considerably improving the efficiency of the whole steering device by decreasing the internal phase shift caused by friction. The simultaneous use of the above described means produces a non-hunting steering device which even in very bumpy weather keeps the airplane in its desired position with great accuracy.

In the drawing,

Fig. 1 is a diagrammatic view, partly in perspective and partly in section, of the improved control.

Fig. 2 is a time-magnitude diagram of the several steering impulses.

In Fig. 1 an automatic course steering device for airplanes is shown, in which the steering impulses caused by the azimuth gyro 1 and by the gyro 2, which responds to angular velocity and angular acceleration, control an air-driven jet pipe relay 3, which in turn controls a hydraulic rudder motor system. This consists of a gear pump 4 for pressure oil and the servomotor 7, connected thereto by pipes 5 and 6, as well as the schematically shown valve 8. The two pipes 5 and 6 are attached to the pressure outlets of the oil pump. The oil is sucked through a pipe 9 from the sump 10 into the suction part of the pump, if the pump wheels 11, 12 and 13 are rotated in the direction shown by arrows. The pump is preferably driven by an electric motor connected to the wheel 12, but not shown.

In order to move the valve 8, a differential pressure diaphragm 14 is employed which is connected by means of two pipes 15 and 16 with the jet openings 15' and 16', which in turn are closely adjacent and opposite to the jet pipe 3. The valve 8 makes it possible to alternately close the lines 17 and 18 which are fed from the lines 5 and 6. The oil pump 4, the valve 8 and the diaphragm 14 preferably are mounted in a common housing, the lower part 10 of which is designed as an oil sump. If, also, the servomotor 7 is combined with the above named parts, the oil circulation is closed within itself so that oil loss because of leaking connections is impossible.

In the mean position of the valve 8, the oil can flow without resistance through the openings 17' and 18' into the sump 10. As soon as the valve 8 is moved away from its mean position, one line is restricted so that either in line 5 or 6 there exists a pressure which now is acting upon the rotary motor 7, causing turning of the rotary piston 19. The rudder 21 is connected to the servomotor by means of a clutch 20.

As shown in the drawing, corresponding opposing chambers of the rudder motor 7 are connected to the pipes 5 and 6. By coupling the rotary motor in the direction of the rudder axis, reacting rudder moments and practically all bearing friction are eliminated. The piston 19 is fitted into its housing with great accuracy so that there are no noticeable pressure losses because of leakage of oil between piston and walls. For the same reason, very small oil pressures will cause appreciable motion of the piston. A further advantage of the rotary motor with respect to the present cylindrical servomotor is found in its space economy.

The amplitude of the rudder 21 is limited by the dynamic pressure of the air against the rudder, whereby an equilibrium of forces between the rudder pressure and the steering pressure of the rudder motor is obtained. The rudder angle, therefore, is substantially proportional to the motion of the valve 8. The valve 8, which is shown schematically in the drawing, preferably is designed as a control pin fitted into the hollow shaft of the gear pump 4, in which this pin will control together with suitable steering channels, the flow of the oil practically without friction or reaction.

Also in the impulse generator all friction has been eliminated as far as possible in order to guarantee the action of the automatic steering device without time lag. The vertical gimbal axis 22 of the azimuth gyro 1 carries a semicircular steering disc 23, which in its mean position partly covers two jet openings 24 and 25, through which pressure air escapes. Directly opposite the jet openings 24 and 25 are two ports 26 and 27 which are connected to the opposite sides of a differential diaphragm 28. The four ports 24, 25, 26 and 27 are mounted in a common housing 29, which is adjustable by means of a crank and worm gear drive in order to enable course setting.

The diaphragm 28 is attached to the gimbal frame 31 of the gyro 2 by means of a spring wire 40, which is stiff in the direction normal to the diaphragm but yielding in a plane parallel thereto, so that no back-lash exists. The gimbal frame 31 is suspended in the housing by means of leaf springs 32 and 33 and has a slotted projection 34 into which a pin 36 projects, which in turn is mounted on the shaft 35 of the jet pipe 3. In this way the motions of the gimbal frame 31 are transmitted to the jet pipe relay 3 with considerable multiplication. The jet pipe, in order to further reduce friction also, may be suspended by springs.

The gimbal frame 31 carries the gyro bearing frame 37, the motions of which are damped by means of a diaphragm box 38, to which it is connected by means of the member 42 and the spring wire 43. The amount of damping can be adjusted by means of a needle valve 39. The diaphragm box 38 also serves the purpose of restraining the gyro around its horizontal precession axis. However, this restraint is much weaker than the restraint around the vertical precession axis by means of the leaf springs 32 and 33.

The operation of the device is as follows: If the airplane is deviating from its intended course, there is produced, in addition to the attitude value given by the azimuth gyro 1, an angular precession of the restrained gyro 2 caused by the motion of the airplane. The gyro 2 precesses first around its horizontal axis and thereby measures substantially the angular velocity. At the same time it precesses around the vertical axis due to the precession of the gyro around its horizontal axis, and this second precession is substantially proportional to the angular acceleration of the aircraft. As explained before, the gyro is strongly restrained around the vertical axis because the freedom around this axis must be kept very small in order to enable the measuring of the angular acceleration. Considerable multiplication has been provided between the gimbal frame 31 and the jet pipe valve 3 in order to obtain the necessary impulses despite the small angular motions of the gyro around the vertical axis.

Due to its powerful restraint, the gimbal frame 31 practically can be considered as rigidly connected to the airplane. As the aircraft is thrown off its course, the gimbal frame 31 tries to maintain its position in space due to the inertia of the gyro 2, so that it deflects the leaf springs 32 and 33, thereby causing an angular motion of the jet pipe 3. The jet pipe moves toward the rear in front of the port 15' as the airplane moves clockwise. Therefore, the left-hand part of the diaphragm of the differential box 14 receives pressure so that the valve 8 restricts the opening 17'. Pressure appears now in pipe 5 which is transmitted to the corresponding sides of the rotary piston 19. The piston therefore turns clockwise and causes a rudder motion counteracting the angular motion of the airplane.

Besides the impulse proportional to the angular acceleration, another impulse proportional to the angular velocity is produced simultaneously, which is transmitted to the jet pipe 3 by the precession of the gyro 2 around its horizontal axis. With the disturbance of the airplane assumed to be in clockwise direction, the gyro precesses in such a way that it increases the volume of the damping box 38 provided the gyro rotates in the direction of the arrow 2'. The damping of this precession is obtained by restraining the air which tries to fill the box 38 by means of the needle valve 39, which generally is adjusted to obtain an aperiodic damping of the inherent period of the gyro system. The spring tension caused by deflection of the diaphragm of box 38 balances the precession moment of the gyro. The reacting couple acting upon gyro 2 around the vertical gimbal axis causes a motion of pin 34 towards the front so that the jet pipe again moves in front of port 15'.

Furthermore, the housing 29 containing the ports 24, 25, 26 and 27 has moved, due to the motion of the airplane, with respect to the stabilized steering disc 23. This opens port 26 more than port 25. Port 26 is connected by means of the pipe 26' with the rear chamber of the box 28, while the front part of the chamber is connected to port 27 through lire 27'. The greater supply of pressure air to port 26 therefore causes a motion of the diaphragm towards the front, whereby the gimbal frame 31 is turned on its vertical axis a small amount counter-clockwise. The jet pipe 3, therefore, is moved further towards the port 15'.

The above described actions all are simultaneous. However, the maximum amplitudes of the different steering impulses are out of phase with each other, as shown in Fig. 2. $a$ is the angle of the course deviation; $b$ is the angular velocity of the airplane and $c$ is its angular acceleration; $d$ is the rudder angle.

The angular acceleration, $c$, may be considered during the steering action as an impulse causing phase advance which counteracts the unavoidable delays in the whole steering system, while the angular velocity $b$ acts to damp the angular velocity of the airplane. The course deviation, $a$, mainly serves for the gradual correction for the course of the airplane and this impulse, therefore is made smaller than $b$ and $c$ for the normal frequency of gusts of wind, so that the characteristic of the steering effect approximately has the shape shown in the dot-dash line in Fig. 2. The dash line, showing the approximate shape of the characteristic of the rudder angle, has a phase advance with respect to the deviation angle $a$, which in case of insufficient damping of the airplane will quickly eliminate any tendency to hunt.

In a manner similar to that shown for the course steering device, the same arrangement may be used for the control of transverse steering and elevation steering. In place of azimuth gyro 1, a horizon gyro will be used to give attitude values, in addition to impulses for the elevation and impulses depending upon the speed and banking in curves. As the inherent damping of airplanes around the longitudinal and transverse axes is considerably greater than around the vertical axis, it will be sufficient in most cases to provide for the automatic steering of the transverse and elevation rudders a gyro measuring only angular velocities with one degree of freedom in place of a gyro responsive to angular accelerations also.

As a source of energy for the gyros in the present case compressed air seems to be preferable, because the steering impulses are also obtained and transmitted pneumatically. The valve 8 may also be controlled electrically without changing the principle of the invention. It is essential for proper functioning of the whole device to secure as little friction and back-lash as possible for all parts of the instrument.

Having described my invention, what I claim and desire to secure by Letters Patent is:

1. In an automatic steering device for aircraft, a rudder, a directional gyroscope, a second gyroscope including a vertical ring, leaf springs constraining said ring for limited constrained movement about a vertical axis, a rotor bearing frame mounted for precession about a horizontal axis in said vertical ring, yielding means opposing said precession, a differential pressure pick-off on said directional gyroscope, a pressure device actuated therefrom for applying a torque to said rate gyroscope about its vertical axis and means including a pick-off device actuated by turning of said vertical ring for controlling the rudder in accordance with the heading, rate of turn and angular acceleration of the aircraft.

2. In an automatic steering device for aircraft, a rudder, a directional gyroscope, a second gyroscope including a vertical ring, leaf springs constraining said ring for limited constrained movement about a vertical axis, each spring being relatively stiff and having one end secured to said vertical ring and the other end substantially fixedly supported with respect to the aircraft, a rotor bearing frame mounted for precession about a horizontal axis in said vertical ring, yielding means opposing said precession, a differential pressure pick-off on said directional gyroscope, a pressure device actuated therefrom for applying a torque to said rate gyroscope about its vertical axis and means including a pick-off device actuated by turning of said vertical ring for controlling the rudder in accordance with the heading, rate of turn and angular acceleration of the aircraft.

ADAM KRONENBERGER.